United States Patent
Bangolae et al.

(10) Patent No.: US 10,455,505 B2
(45) Date of Patent: Oct. 22, 2019

(54) PAGING ENHANCEMENT FOR EXTENDED DRX IN CELLULAR SYSTEMS

(71) Applicant: INTEL IP CORPORATION, Santa Clara, CA (US)

(72) Inventors: Sangeetha Bangolae, Houston, TX (US); Alexandre Stojanovski, Paris (FR); Marta Martinez Tarradell, Hillsboro, OR (US); Richard Burbidge, Shrivenham (GB); Puneet Jain, Hillsboro, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/566,201

(22) PCT Filed: Dec. 24, 2015

(86) PCT No.: PCT/US2015/000359
§ 371 (c)(1),
(2) Date: Oct. 12, 2017

(87) PCT Pub. No.: WO2016/182530
PCT Pub. Date: Nov. 17, 2016

(65) Prior Publication Data
US 2018/0338281 A1    Nov. 22, 2018

Related U.S. Application Data

(60) Provisional application No. 62/159,699, filed on May 11, 2015.

(51) Int. Cl.
*H04W 52/02* (2009.01)
*H04W 76/28* (2018.01)
*H04W 68/02* (2009.01)

(52) U.S. Cl.
CPC ... *H04W 52/0216* (2013.01); *H04W 52/0229* (2013.01); *H04W 68/02* (2013.01);
(Continued)

(58) Field of Classification Search
CPC . H04W 52/0216; H04W 68/02; H04W 76/28; H04W 52/0229; Y02D 70/21;
(Continued)

(56) References Cited

U.S. PATENT DOCUMENTS

2013/0044659 A1   2/2013  Jokimies et al.
2015/0327032 A1*  11/2015 Hedman ............... H04W 4/70
                                                              370/329

FOREIGN PATENT DOCUMENTS

GB      2514117    * 11/2014
GB      2514177 A    11/2014
(Continued)

OTHER PUBLICATIONS

CATT; "Test proposal to TR37.869 on extended DRX cycle in idle mode"; 3GPP TSG R2-132497; (Aug. 19-23, 2013); 5 pages; RAN WG2 Meeting #83, Barcelona, Spain; Agenda: 5.2.2.
(Continued)

*Primary Examiner* — Afshawn M Towfighi
(74) *Attorney, Agent, or Firm* — Thorpe North & Western

(57) ABSTRACT

Technology described herein relates to systems, methods, and computer readable media to implement extended Discontinuous Reception (eDRX) for user equipments (UEs). A Mobility Management Entity (MME) can be aware of the starting time and length of an eDRX cycle of a UE so that the MME can send a paging message for the UE to an evolved Node B (eNB) shortly ahead of a Paging Occasion (PO). In some examples, more than one PO can be included within an eDRX cycle. An eDRX timer can be used to control the duration of waking times and, if desired, to
(Continued)

maintain legacy compatibility. Additional examples provide a way for the MME to update calculations regarding the starting time and length of eDRX cycle of the UE such that the MME will continue to be apprised of when the UE will be reachable when the UE moves between cells.

26 Claims, 11 Drawing Sheets

(52) U.S. Cl.
CPC ......... *H04W 76/28* (2018.02); *Y02D 70/1224* (2018.01); *Y02D 70/1262* (2018.01); *Y02D 70/142* (2018.01); *Y02D 70/144* (2018.01); *Y02D 70/146* (2018.01); *Y02D 70/21* (2018.01); *Y02D 70/24* (2018.01)

(58) Field of Classification Search
CPC ............... Y02D 70/146; Y02D 70/142; Y02D 70/1224; Y02D 70/24; Y02D 70/1262; Y02D 70/144
See application file for complete search history.

(56) References Cited

FOREIGN PATENT DOCUMENTS

| WO | WO 2014/158268 A1 | 10/2014 |
|---|---|---|
| WO | WO 2015005853 A2 | 1/2015 |

OTHER PUBLICATIONS

3GPP TR 37.869; "3$^{rd}$ Generation Partnership Project; Technical Specification Group Radio Access Network; Study on Enhancements to Machine-Type Communications (MTC) and other Mobile Data Applications; Radio Access Network (RAN) aspects"; (Sep. 2013); 43 pages; V12.0.0, Release 12.

Ericsson et al.; "Conclusions for FS_HLcom"; 3GPP SA S2-151429; (Apr. 13-17, 2015); 2 pages; WG2 Meeting #108, San Jose del Cabo, Mexico; Agenda: 6.12, Rel-13.

Huawei (Rapporteur); "Summary of email discussion [82#13][Joint/MTCe] Evaluation of extended DRX cycles for UEPCOP"; 3GPP TSG R2-132893; (Aug. 19-23, 2013); 23 pages; RAN WG2 #83, Barcelona, Spain; Agenda: 5.2.2.

Intel Corporation; "Performance evaluation of extended DRX cycle in idle mode"; 3GPP TSG R2-152171; (May 25-29, 2015); 5 pages; RAN WG2 Meeting #90, Fukuoka, Japan; Agenda: 7.10.

Qualcomm (3GPP SA WG2); "LS on RAN assumptions from SA2 for FS_eDRX"; 3GPP TSG R2-151028; (Apr. 20-24, 2015); 1 page; RAN WG2 Meeting #89bis, Bratislava, Slovakia; Rel-13.

Qualcomm Incorporated; "New WI Proposal: RAN enhancements for extended DRX in LTE"; 3GPP TSG RP-150493; (Mar. 9-12, 2015); 7 pages; RAN Meeting #67, Shanghai, China; Agenda: 13.1.2.

Qualcomm; "Motivation for RAN2 Rel-13 WID Proposal: RAN enhancements for Extended DRX in LTE"; 3GPP RP-150181; (Mar. 9-12, 2015); 11 pages; RAN #67, Shanghai, China.

SA WG2 Chairman et al.; "New Study WID on Optimizations to Support High Latency Communications"; 3GPP TSG SP-140635; (Sep. 15-17, 2014); 6 pages; SA Meeting #65, Edinburgh, Scotland, UK; Agenda: 16.

ZTE; "New SI Proposal: Study on RAN aspects of Machine-Type and other mobile data applications Communications enhancements"; 3GPP TSG RP-130396; (Feb. 26-Mar. 1, 2013); 5 pages; RAN Meeting #59, Vienna, Austria; Agenda: 13.2.

ZTE; "New WI Proposal: RAN enhancements for Machine-Type and other mobile data applications Communications"; 3GPP TSG RP-132052; (Dec. 3-6, 2013); 5 pages; RAN Meeting #62 Busan, South Korea; Agenda: 13.1.2.

International search report dated Dec. 20, 2017 in International Application No. PCT/US2015/000359, filed Dec. 24, 2015; 7 pages.

\* cited by examiner

ATTACH REQUEST message content

| IEI | Information Element | Type/Reference | Presence | Format | Length |
|---|---|---|---|---|---|
|  | Protocol discriminator | Protocol discriminator 9.2 | M | V | 1/2 |
|  | Security header type | Security header type 9.3.1 | M | V | 1/2 |
|  | Attach request message identity | Message type 9.8 | M | V | 1 |
|  | EPS attach type | EPS attach type 9.9.3.11 | M | V | 1/2 |
|  | NAS key set identifier | NAS key set identifier 9.9.3.21 | M | V | 1/2 |
|  | EPS mobile identity | EPS mobile identity 9.9.3.12 | M | LV | 5-12 |
|  | UE network capability | UE network capability 9.9.3.34 | M | LV | 3-14 |
|  | ESM message container | ESM message container 9.9.3.15 | M | LV-E | 5-n |
| 19 | Old P-TMSI signature | P-TMSI signature 9.9.3.26 | O | TV | 4 |
| 50 | Additional GUTI | EPS mobile identity 9.9.3.12 | O | TLV | 13 |
| 52 | Last visited registered TAI | Tracking area identity 9.9.3.32 | O | TV | 6 |
| 5C | DRX parameter | DRX parameter 9.9.3.8 | O | TV | 3 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type 9.9.3.0B | O | TV | 1 |
| 5D | Voice domain preference and UE's usage setting | Voice domain preference and UE's usage setting 9.9.3.44 | O | TLV | 3 |

FIG. 2

ATTACH ACCEPT message content

| IEI | Information Element | Type/Reference | Presence | Format | Length |
|---|---|---|---|---|---|
|  | Protocol discriminator | Protocol discriminator 9.2 | M | V | 1/2 |
|  | Security header type | Security header type 9.3.1 | M | V | 1/2 |
|  | Attach accept message identity | Message type 9.8 | M | V | 1 |
|  | EPS attach result | EPS attach result 9.9.3.10 | M | V | 1/2 |
|  | Spare half octet | Spare half octet 9.9.2.9 | M | V | 1/2 |
|  | T3412 value | GPRS timer 9.9.3.16 | M | V | 1 |
|  | TAI list | Tracking area identity list 9.9.3.33 | M | LV | 7-97 |
|  | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16B | O | TLV | 3 |
| F1 | T3324 value | GPRS timer 9.9.3.16 | O | TV | 2 |

S-1 AP Paging

Direction: MME → eNB

| IE/Group Name | Presence | Range | IE type and reference | Criticality | Assigned Criticality |
|---|---|---|---|---|---|
| Message Type | M | | 9.2.1.1 | YES | ignore |
| UE Identity Index value | M | | 9.2.3.10 | YES | ignore |
| UE Paging Identity | M | | 9.2.3.13 | YES | ignore |
| Paging DRX | O | | 9.2.1.16 | YES | ignore |
| CN Domain | M | | 9.2.3.22 | YES | ignore |
| List of TAIs | | 1 | | YES | ignore |
| >TAI List Item | | 1 to <maxnoofTAIs> | | EACH | ignore |
| >>TAI | M | | 9.2.3.16 | - | |
| CSG Id List | | 0..1 | | GLOBAL | ignore |
| >CSG Id | | 1 to <maxnoofCSGId> | 9.2.1.62 | - | |
| Paging Priority | O | | 9.2.1.78 | YES | Ignore |
| Extended Paging retries | O | 1 .. <maxnopaging retries> | 9.2.1.xx | YES | Ignore |

400b

| Range bound | Explanation |
|---|---|
| maxnoofTAIs | Maximum no. of TAIs. Value is 256. |
| maxnoofCSGIds | Maximum no. of CSG Ids within the CSG Id List. Value is 256. |
| *maxnopaging retries* | Maximum no. of paging retries. Value is 256. |

400c

| IE/Group Name | Presence | Range | IE Type and Reference | Semantics Description |
|---|---|---|---|---|
| Extended Paging retries | O | | INTEGER (0..255) | |

FIG. 4

PAGING ENHANCEMENT FOR EXTENDED DRX IN CELLULAR SYSTEMS

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.1.1 standard, which is commonly known to industry groups as WiFi.

In 3GPP radio access network (RAN) LTE systems, the node in an Evolved Universal Terrestrial Radio Access Network (E-UTRAN) system is referred to as an eNode B (also commonly denoted as evolved Node Bs, enhanced Node Bs, eNodeBs, or eNBs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 is a table that includes examples of information elements (IEs) that can be included in a request message in accordance with an example;

FIG. 3 is a table that includes examples of information elements (IEs) that can be included in an accept message in accordance with an example;

FIG. 4 includes three tables that describe examples of information elements (IEs) that can be included in a paging message in accordance with an example;

Figure 1A:
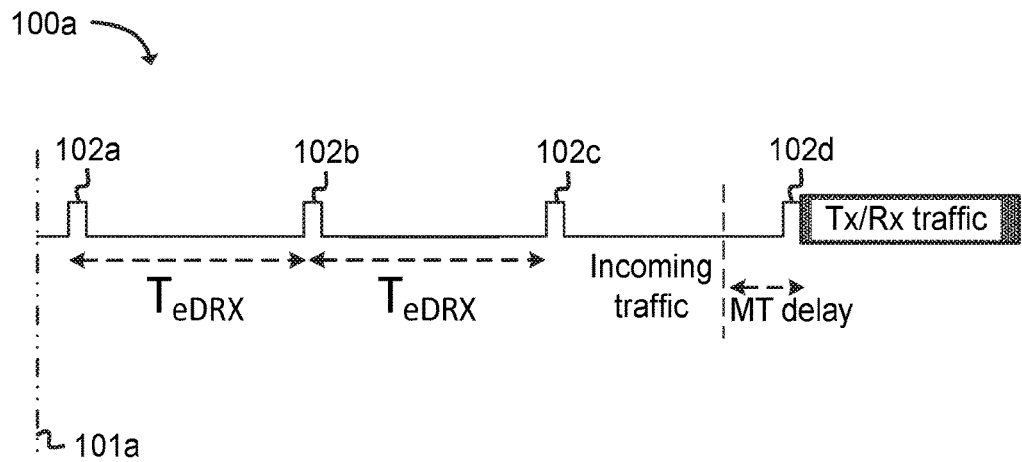
FIG. 1a is a diagram illustrating relative positions of paging occasions (POs) that are to be monitored by a UE in accordance with an example.

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

Use of mobile cellular systems, such as Third Generation Partnership Project (3GPP) Long-term Evolution (LTE) systems, is growing at a rapid rate. In the near future, widespread use of Machine-Type Communication (MTC) applications, such as smart utility metering, intelligent supply-chain tracking, fleet management, theft tracking, vehicle-to-infrastructure communication, and Internet-of-Things (IoT) communication, will create a great deal of cellular traffic. The Third Generation Partnership Project (3GPP) is conducting ongoing studies to address the potential challenges that may be posed by the support of billions of connected devices (e.g., MTC and IoT devices). User equipments (UEs) used for these MTC applications can be nomadic (e.g., a tracking device on an automobile) or relatively stationary (e.g., a temperature sensor mounted to a building). UEs for MTC applications may have low priority relative to other applications that use cellular communication and may send small amounts of Mobile Originated (MO) or Mobile Terminated (MT) data very infrequently. For UEs that are used for MTC applications, it can crucial to save UE battery power because some of these UEs may not have the ability to charge their batteries for long periods of time (or even for the duration of their lifetimes). Hence, extended Discontinuous Reception (DRX) can be a viable solution to keep these UEs in a low-power idle mode for longer periods of time so that battery power can be conserved.

In earlier releases of 3GPP (e.g. release 12), a power saving mode (PSM) within Radio Resource Control (RRC) idle more was standardized. In PSM, a UE is performs a TAU (Tracking Area Update) procedure every time the UE checks for MT (e.g., downlink) data. This leads to waste of signaling and an increase in UE power consumption when no data is transmitted. Extended DRX (eDRX) provides a better approach for UEs that have stringent delay rules for MT access and prefer to save power. With extended DRX, devices that have to guarantee shorter delays for MT access, such as smartphones, often suffer from battery drain due to frequent communication with the network and are constrained by the current limitation of DRX cycle (i.e., 2.56 sec).

Systems and technologies of the present disclosure help mitigate some challenges that arise when seeking to implement eDRX for UEs. For example, some examples of the present disclosure can assist a Mobility Management Entity (MME) with S1 Paging (S1 referring to an interface between an eNB and a core network) by making the MME aware of an eDRX cycle so that the MME knows when to send an S1 Paging message (e.g., shortly ahead of a Paging Occasion (PO)). This makes it possible for the S1 PAGING message to be stored at the eNB for a very short time rather than a long time (e.g., possibly minutes). In addition, by keeping track of POs of the UE, the MME can facilitate appropriate handling MT data or Simple Messaging Service (SMS) data because the MME is apprised of whether the UE will be reachable at a given time. In addition, some examples of the present disclosure can make paging more reliable (e.g., by offering more than one PO within an eDRX cycle). Some examples of the present disclosure provide a way to extend the SFN (System Frame Number) that currently wraps around 10.24 second by introducing a time-based mechanism. Some examples also introduce paging mechanisms that re-utilize the current paging mechanism, but introduce the timer on top of the cycles to control the duration of waking times.

Another challenge arises when eDRX is used by for UEs that are moving between cells that may not be synchronized. If a UE in a deep sleep mode (e.g., in an eDRX cycle) moves between nodes, an MME may no longer be aware of when the UE will be reachable if the UE is moving between cells that are not at least loosely synchronized. Some examples of the present disclosure provide a way for the MME to update its calculations for times when the UE will be reachable without requiring any synchronization between cells through which the UE is moving.

FIG. 1a is a diagram illustrating relative positions of paging occasions (POs) 102a-d that are to be monitored by a UE along a timeline 100a that commences at an instant 101a when the UE triggers the use of eDRX. As shown in FIG. 1a, the paging occasions 102a-d that are to be monitored by the UE can occur at regular intervals of duration $T_{eDRX}$, where $T_{eDRX}$ is the duration of an eDRX cycle. The UE can monitor for a paging message at each of the POs 102a-d. Incoming traffic for the UE can be identified at an MME at a time between the PO 102c and the PO 102d. The MME can send a paging message to the UE at PO 102d to notify the UE that there is incoming traffic for the UE. The UE can then trigger random access procedure to establish an RRC connection so that the incoming traffic can be received and outgoing traffic can also be sent.

The legacy paging scheme illustrated by FIG. 1a can be modified so that an MME can be aware of a UE's paging cycle and wait to send an paging message for the UE to a serving eNB so that the paging message will not have to be stored at the eNB for relatively long time periods. Options 1b-c and their accompanying FIGS. 1b-c explain several paging schemes that enable an MME to store a paging message for a UE in this fashion.

Option 1b: eDRX Using the Existing PO Mechanism and an Absolute Clock Reference Based on UTC In option 1(b), a UE can send a request message (e.g., an Attach/TAU Request) to an MME requesting that the UE be permitted to commence an eDRX cycle. The message can include a proposed eDRX timer value or some other indication (e.g., an extended DRX indication) that the UE is requesting to commence an eDRX cycle. The MME can send an accept message (e.g., an Attach/TAU Accept) granting the UE permission to commence the eDRX cycle. The accept message can include an eDRX timer value $T_{eDRX}$. In cases where the request message included a proposed eDRX timer value, $T_{eDRX}$ can be equal to the proposed eDRX timer value. Alternatively, $T_{eDRX}$ can be a different timer value that the MME deems acceptable.

The accept message can also include an absolute time reference $T_{ref}$ that indicates a time at which an eDRX timer should be started. $T_{ref}$ can be based on, for example, Coordinated Universal Time (UTC) and can be encoded in a similar way as the UTC time provided in System Information Block 16 (e.g., as a five-octet integer value). The $T_{ref}$ value can be UE-specific and can determine an instant on a time axis that is used as a time reference for determining which paging occasions (POs) the UE should monitor for reception of paging messages. After the eDRX timer expires, the next PO(s) to monitor can be defined as the first PO(s) after each periodic instant $T_N$, where $T_N=T_{ref}+N*T_{eDRX}$ (where N is a non-negative integer or a positive integer). The timing at which POs occur (including the PO(s) to monitor) can be determined based on, for example, a (non-extended) DRX cycle $T_{DRX}$, a paging configuration within a cell of a serving eNB for the UE, and the UE ID (e.g., according to the legacy paging mechanism described in 3GPP Technical Specification (TS) 36.304). In one example, a UE can be configured to "wake up" at the instants $T_N$. Each time the UE wakes up, the UE can stay awake until the UE has monitored one PO (e.g., the first PO that occurs after the UE wakes up). Alternatively the exact instants where the UE wakes up can be earlier or later than $T_N$ as long as the UE is able to receive the correct PO. In another alternative, the UE can wake up based on $T_N$ in order to read System Information (SI) or perform cell re-selection, but does not have to read the Physical Downlink Control Channel (PDCCH) in all sub frames until the occurrence of a Paging Frame (PF) or PO that is to be monitored by the UE. The MME can also provide different $T_{ref}$ values to different UEs in order to stagger the paging cycles of the UEs so that access-related congestion can be avoided.

Figure 1B:
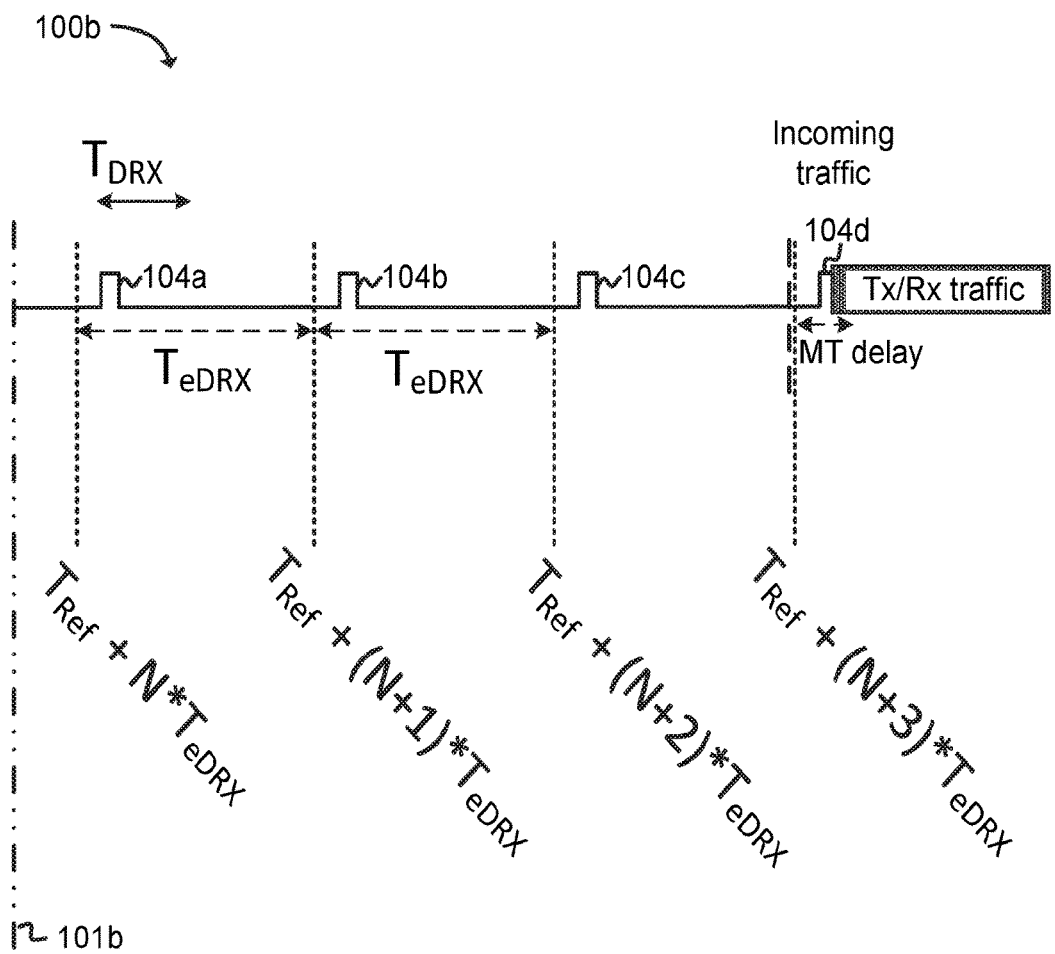
FIG. 1b is a diagram illustrating an example timeline for a paging scheme in accordance with an example.

FIG. 1b is a diagram illustrating an example timeline 100b for the paging scheme of option 1b. After entering an idle mode at an instant 101b when the UE triggers the use of eDRX, the UE can wake up at a time $T_{ref}$, where $T_{ref}$ is an absolute time reference. The $T_{REF}$ can be provided by an MME. If there is a delay between the time when the UE enters idle mode and the $T_{REF}$, the UE can elect to either monitor POs based on a legacy DRX cycle (as defined by a DRX timer value $T_{DRX}$) or not check a PDCCH during the delay. Once the $T_{Ref}$ value is reached, the eDRX timer can be started and the UE can awaken for a first PO 104a. The PO 104a can be based on legacy DRX cycle timing, where $T_{DRX}$ specifies the duration of a DRX cycle.

After monitoring the PO 104a, the UE can then refrain from monitoring additional legacy POs until the eDRX timer expires. When the eDRX timer expires (e.g., after 120 seconds, 300 seconds, or some other predefined eDRX timer value for $T_{eDRX}$), the UE can wake up again for the next PO 104b of the legacy DRX cycle that occurs after the next time instant $T_N$, where $T_N=T_{ref}+N*T_{eDRX}$ (where N is a non-negative integer or a positive integer). The maximum delay to find any of the POs 104a-d would therefore be less than 2.56 seconds if the UE's normal DRX cycle is configured to be, for example, 2.56 seconds. Incoming traffic for the UE can be identified at an MME at a time between the PO 104c and the PO 104d. The MME, being apprised of the $T_{ref}$ and the time instants $T_N$, can send a paging message for the UE shortly before the $T_N$ preceding the PO 104d to notify the UE that there is incoming traffic for the UE. The UE can then trigger a random access procedure to establish an RRC connection so that the incoming traffic can be received and any outgoing traffic can also be sent.

Option 1(c): Extended DRX Cycle Using the Existing PO Mechanism and an Absolute Clock Reference ($T_{ref}$) Based on UTC+Repetitions Option 1(c) is similar to option 1(b) and adds the feature that a UE can monitor more than one PO after waking up. A UE can send a request message (e.g., an Attach/TAU Request) to an MME requesting that the UE be permitted to commence an eDRX cycle. The message can include a proposed eDRX timer value or some other indication (e.g., an extended DRX indication) that the UE is requesting to commence an eDRX cycle. The MME can send an accept message (e.g., an Attach/TAU Accept) granting the UE permission to commence the eDRX cycle. The accept message can include an eDRX timer value $T_{eDRX}$. In cases where the request message included a proposed eDRX timer value, $T_{eDRX}$ can be equal to the proposed eDRX timer value. Alternatively, $T_{eDRX}$ can be a different timer value that the MME deems acceptable.

The accept message can also include a number of normal DRX repetitions $N_{DRX}$, where $N_{DRX}$ indicates a number of POs the UE should monitor immediately after each time the UE wakes up at the commencement of an eDRX cycle.

The accept message can also include an absolute time reference $T_{ref}$ that indicates a time at which an eDRX timer should be started. $T_{ref}$ can be based on, for example, Coordinated Universal Time (UTC) and can be encoded in a similar way as the UTC time provided in System Information Block 16 (e.g., as a five-octet integer value). The $T_{ref}$ value can be UE-specific and can determines an instant on a time axis that is used as a time reference for determining which paging occasions (POs) the UE should monitor for reception of paging messages. After the eDRX timer expires, the next POs to monitor can be defined as the first $N_{DRX}$ POs after each periodic instant $T_N$, where $T_N=T_{ref}N*T_{eDRX}$ (where N is a non-negative integer or a positive integer). The timing at which POs occur (including the PO(s) to monitor) can be determined based on, for example, a (non-extended) DRX cycle $T_{DRX}$, a paging configuration within a cell of a serving eNB for the UE, and the UE ID (e.g., according to the legacy paging mechanism described in 3GPP Technical Specification (TS) 36.304). In one example, a UE can be configured to "wake up" at the instants $T_N$. Each time the UE wakes up, the UE can stay awake until the UE has monitored $N_{DRX}$ POs (e.g., the $N_{DRX}$ POs that occurs after the UE wakes up). Alternatively, the exact instants where the UE wakes up can be earlier or later than $T_N$ as long as the UE is able to monitor $N_{DRX}$ POs. In another alternative, the UE can wake up based on $T_N$ in order to read System Information (SI) or perform cell re-selection, but does not have to read the Physical Downlink Control Channel (PDCCH) in all sub frames until the occurrence of a Paging Frame (PF) or PO that is to be monitored by the UE. The MME can also provide different $T_{ref}$ values to different UEs in order to stagger the paging cycles of the UEs so that access-related congestion can be avoided.

Figure 1C:
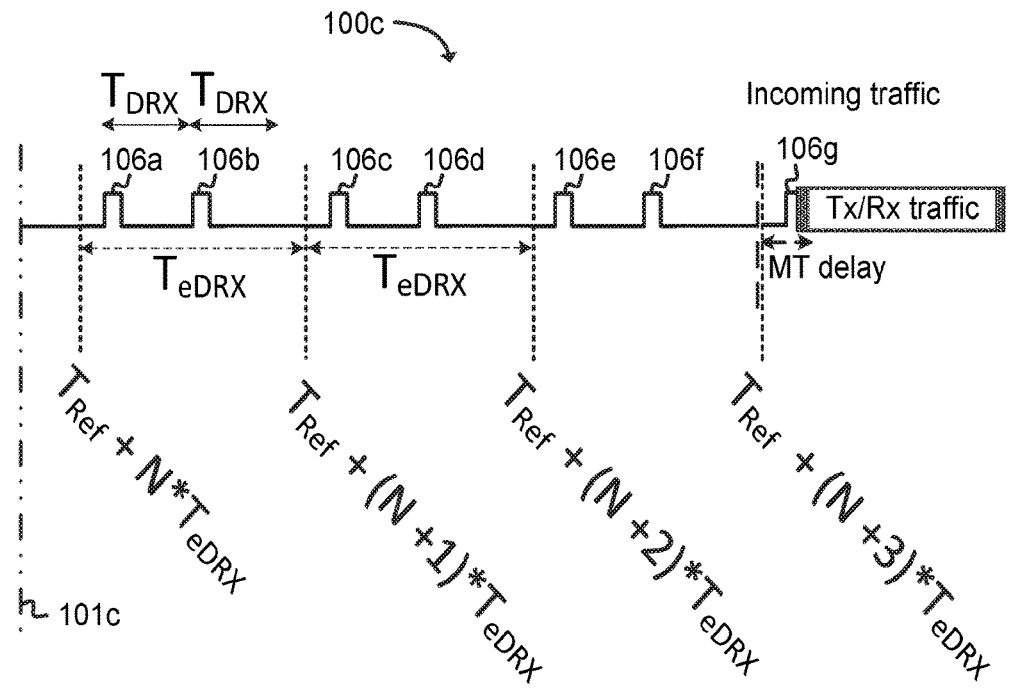
FIG. 1c is a diagram illustrating an example timeline for another paging scheme in accordance with an example.

FIG. 1c is a diagram illustrating an example timeline 100c for the paging scheme of option 1c. After entering an idle mode at an instant 101c when the UE triggers the use of eDRX, the UE can wake up at a time $T_{ref}$, where $T_{ref}$ is an absolute time reference. The $T_{Ref}$ and an $N_{DRX}$ can be provided by an MME, where $N_{DRX}$ indicates a number of POs to be monitored for each eDRX cycle. For simplicity, $N_{DRX}$ is assumed to be 2 in FIG. 1c. However, other positive integer values can be used for $N_{DRX}$ in other examples.

If there is a delay between the time when the UE enters idle mode and the $T_{Ref}$, the UE can elect to either monitor POs based on a legacy DRX cycle (as defined by a DRX timer value $T_{DRX}$) or not check a PDCCH during the delay. Once the $T_{Ref}$ value is reached, the eDRX timer can be started and the UE can awaken to monitor $N_{DRX}$ POs—specifically, the POs 106a and 106b. The POs 106a and 106b can be based on legacy DRX cycle timing, where $T_{DRX}$ specifies the duration of a DRX cycle and the start of the PO 106a and the start of the PO 106b are offset by $T_{DRX}$.

After monitoring the POs 106a-b, the UE can then refrain from monitoring additional legacy POs until the eDRX timer expires. When the eDRX timer expires (e.g., after 120 seconds, 300 seconds, or some other predefined eDRX timer value for $T_{eDRX}$), the UE can wake up again for the next $N_{DRX}$ POs 106c-d that occur after the next time instant $T_N$, where $T_N=T_{ref}+N*T_{eDRX}$ (where N is a non-negative integer or a positive integer). The maximum delay to find any of the POs 104a-g would therefore be less than 2.56 seconds if the UE's normal DRX cycle is configured to be, for example, 2.56 seconds. Incoming traffic for the UE can be identified at an MME at a time between the POs 106e-f and a following $T_N$. The MME, being apprised of the $T_{ref}$ and the time instants $T_N$, can send a paging message for the UE shortly before the $T_N$ preceding the PO 106g to notify the UE that there is incoming traffic for the UE. The UE can then trigger a random access procedure to establish an RRC connection so that the incoming traffic can be received and any outgoing traffic can also be sent.

In some alternative approaches, a serving the eNB for the UE can be configured to autonomously send multiple RRC paging messages based on the eDRX configuration for the UE and the number of POs might be increased within a PF. If additional POs are added included within the PF, the additional POs can be referred to as extended POs (ePOs) and can potentially follow a subframe pattern that is independent of legacy PO calculation.

Option 1(d): Extended DRX Cycle Using an Absolute Clock Reference ($T_{ref}$) That is Also Used for PO Determination In option 1(d), POs are determined based on the $T_{ref}$ without regard to timing of any legacy DRX cycles. Option 1(d) can impact the the Access Stratum in the sense that the way that legacy paging mechanisms work is changed; the calculation of the PO does not depend on the UE ID usage.

In option 1(d), a UE can send a request message (e.g., an Attach/TAU Request) to an MME requesting that the UE be permitted to commence an eDRX cycle. The message can include a proposed eDRX timer value or some other indication (e.g., an extended DRX indication) that the UE is requesting to commence an eDRX cycle. The MME can send an accept message (e.g., an Attach/TAU Accept) granting the UE permission to commence the eDRX cycle. The accept message can include an eDRX timer value $T_{eDRX}$. In cases where the request message included a proposed eDRX timer value, $T_{eDRX}$ can be equal to the proposed eDRX timer value. Alternatively, $T_{eDRX}$ can be a different timer value that the MME deems acceptable.

The accept message can also include an absolute time reference $T_{ref}$ that indicates a time at which an eDRX timer should be started. $T_{ref}$ can be based on, for example, Coordinated Universal Time (UTC) and can be encoded in a similar way as the UTC time provided in System Information Block 16 (SIB16) (e.g., as a five-octet integer value). The $T_{ref}$ value can be UE-specific and can determines an instant on a time axis that is used as a time reference for determining which paging occasions (POs) the UE should monitor for reception of paging messages. After the eDRX timer expires, the next PO(s) to monitor can be defined as the first resources(s) that can be used after each periodic instant $T_N$, where $T_N=T_{ref}+N^*T_{eDRX}$ (where N is a non-negative integer or a positive integer). The timing at which POs occur can be determined based on $T_{ref}$ without regard to legacy DRX timing. The resources that can be used for transmission of paging messages can be configured via system information broadcast by a serving cell for the eNB.

In one example, a UE can be configured to "wake up" at the instants $T_N$. Each time the UE wakes up, the UE can stay awake until the UE has monitored one PO (e.g., the first PO that occurs after the UE wakes up). Alternatively the exact instants where the UE wakes up can be earlier or later than $T_N$ as long as the UE is able to receive the correct PO. In another alternative, the UE can wake up based on $T_N$ in order to read System Information (SI) or perform cell re-selection, but does not have to read the Physical Downlink Control Channel (PDCCH) in all sub frames until the occurrence of a Paging Frame (PF) or PO that is to be monitored by the UE. The MME can also provide different $T_{ref}$ values to different UEs in order to stagger the paging cycles of the UEs so that access-related congestion can be avoided.

Figure 1D:
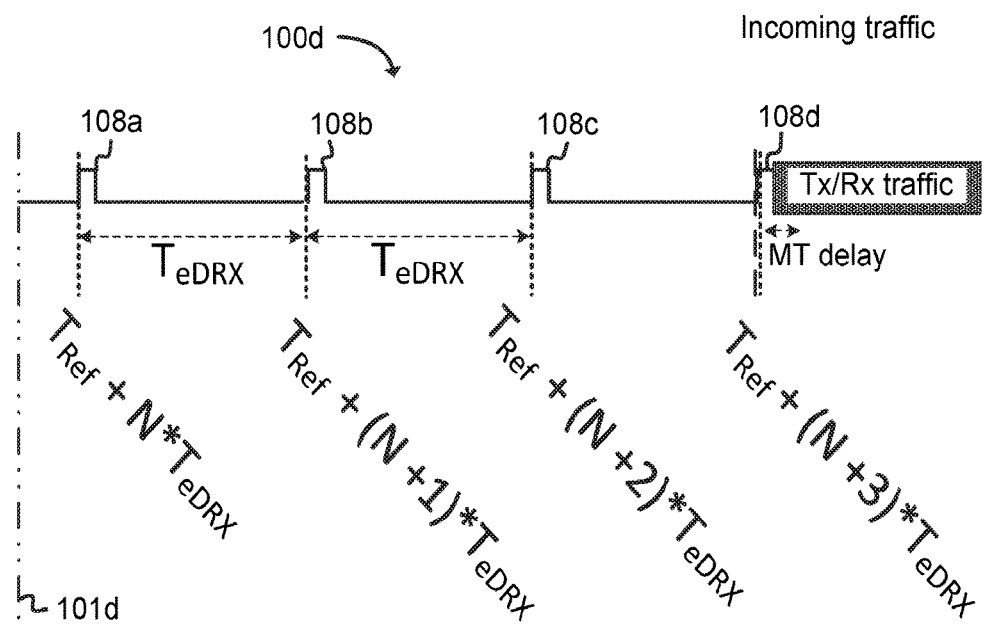
FIG. 1d is a diagram illustrating an example timeline for another paging scheme in accordance with an example.

FIG. 1d is a diagram illustrating an example timeline 100d for the paging scheme of option 1d. After entering an idle mode at an instant 101d when the UE triggers the use of eDRX, the UE can wake up at a time $T_{ref}$, where $T_{ref}$ is an absolute time reference. The $T_{REF}$ can be provided by an MME. If there is a delay between the time when the UE enters idle mode and the $T_{REF}$, the UE can elect to either monitor POs based on a legacy DRX cycle (as defined by a DRX timer value $T_{eDRX}$) or not check a PDCCH during the delay. Once the $T_{REF}$ value is reached, the eDRX timer can be started and the UE can awaken for a first PO 108a. The PO 108a can be based on $T_{ref}$ without regard to legacy DRX timing.

After monitoring the PO 108a, the UE can then refrain from monitoring additional POs until the eDRX timer expires. When the eDRX timer expires (e.g., after 120 seconds, 300 seconds, or some other predefined eDRX timer value for $T_{eDRX}$), the UE can wake up again for the next PO 108b that occurs after the next time instant $T_N$, where $T_N=T_{ref}+N^*T_{eDRX}$ (where N is a non-negative integer or a positive integer). The maximum delay to find any of the POs 108a-d would therefore be $T_{eDRX}$. Incoming traffic for the UE can be identified at an MME at a time between the PO 108c and the PO 108d. The MME, being apprised of the $T_{ref}$ and the time instants $T_N$, can send a paging message for the UE shortly before the $T_N$ preceding the PO 108d to notify the UE that there is incoming traffic for the UE. The UE can then trigger a random access procedure to establish an RRC connection so that the incoming traffic can be received and any outgoing traffic can also be sent.

FIG. 2 is a table that includes examples of information elements (IEs) that can be included in a request message (e.g., an Attach/TAU Request). As shown in the bottom two rows, an extended DRX timer IE and an extended DRX indication IE can be included.

FIG. 3 is a table that includes examples of information elements (IEs) that can be included in an accept message (e.g., an Attach/TAU Accept). As shown in the bottom four rows, an extended DRX timer IE, an extended DRX indication IE, a $T_{ref}$ IE, and an $N_{DRX}$ IE can be included.

FIG. 4 includes three tables that describe examples of information elements (IEs) that can be included in a paging message (e.g., an S-1 Access Point (AP) Paging Message) that is sent from an MME to a UE through a serving eNB. As shown on the last row of table 400a, an extended paging retries IE can be included. The extended paging retries IE can indicate to the eNB serving a UE a number of times that the eNB should attempt to send a paging message to a UE per eDRX paging cycle. As shown on the last row of table 400b, a range bound ("maxnopaging retries") can apply to the extended paging retries IE. As shown on the last row of table 400c, the extended paging retries IE can be an integer.

While some of the examples included herein have been described in the context of E-UTRAN access, the principles embodied in those examples can also be readily applied for UTRAN access by substituting a Serving General-Packet-Radio-Service (GPRS) Support Node (SGSN) for an MME and a RAU accept message for a TAU Accept message.

If a UTC reference is not available in a radio access network (e.g. either because SIB16 is not deployed in E-UTRAN or because UTRAN currently does not support signaling of the UTC in a system information block) or is not used for some other reason, the periodic occurrences when the UE wakes up can still be determined based on the an instant of an S1 release $T_{rlsS1}$. For instance, upon completion of the S1 Release procedure at $T_{rlsS1}$, the MME can signal a time offset value $T_{Offset}$ to a serving eNB eNB in an [S1-AP] S1 UE CONTEXT RELEASE message. The serving eNB can then send $T_{Offset}$ to the UE in an RRC Connection Release message. The MME can determine the periodic occurrences as $T_N=(T_{rlsUu}+T_{Offset}+N^*T_{eDRX})$, whereas the UE can determine the periodic occurrences as $T_N=(T_{rlsUu}+T_{Offset}+N^*T_{eDRX})$, where $T_{rlsUu}$ is the instant of completion of the RRC Connection Release procedure at the UE.

Extended DRX Cycle in Idle Mode Between Non-H-SFN-Synchronized Cells

The Radio Access Network 2 (RAN2) Working Group (WG) has agreed to use the H-SFN in allow a UE to (re)synchronize while in idle mode in an eDRX cycle without having to generate additional over-the-air signaling and without having to read a time reference information (e.g., sent in a SIB16, since the of a SIB16 for clearance of any clock drift while a UE is in deep sleep mode would consume more power than using the H-SFN). However, the RAN2 WG raised the concern that the network nodes may have to be loosely synchronized under existing proposals—and loose synchronization is a feature that is difficult to specify.

Some examples of the present disclosure allow a UE moving between cells to (re)synchronize while in idle mode in an eDRX cycle without requiring any synchronization between eNBs. It is assumed that RAN nodes (e.g. eNBs) will broadcast H-SFN information and time reference information, such as UTC (Coordinated Universal Time), using SIB16. Therefore, in one example, a UE operating in eDRX can maintain a mapping or another relation between the absolute time reference and the actual H-SFN/SFN for a given cell. This allows the UE to determine when the UE should become reachable within the eDRX cycle based on the H-SFN/SFN of a cell.

The duration of an eDRX cycle ($T_{eDRX}$) and the duration of an interval $T_i$ when the UE is reachable can be defined by Non-Access Stratum (NAS signaling) and can be based on an absolute time reference. Alternatively, $T_{eDRX}$ and $T_i$ can be event-based.

When the UE changes cells, the UE may have to to re-acquire the time-based information of the cell into which the UE moves in order to update the UE's mapping or relation of the H-SFN and time. If the following assumptions are met, the updating can be accomplished. One assumption is that the eNB of the cell the UE is leaving (the first eNB) and the eNB of the cell the UE is entering (the second eNB) broadcast time reference information (such as UTC signaled via a SIB 16) and broadcast their respective H-SFNs. The H-SFNs are eNB-specific and might not be synchronized between the UEs, but the time reference information is common for nodes in the network. Another assumption is that the UE and both eNBs support an eDRX configuration. Another assumption is that the UE is connected to, and will go into eDRX in, the eNB of the cell the UE is leaving (the first eNB).

In a first action, an MME can configure the UE for an eDRX operation based on an absolute time reference or based on an event trigger. The UE can map the start of the eDRX cycle to the absolute time reference signaled via SIB16 and to the actual H-SFN/SFN of the first eNB.

In a second action, the UE can periodically wake up to read the H-SFN in order to clear any internal clock drift while the UE is in a deep sleep mode (e.g., in an eDRX cycle). While in the deep sleep mode, the UE can move into coverage of another cell that is controlled by the second eNB.

In a third action, the UE can detect, upon a periodic wake-up from the deep sleep mode that the UE is in the coverage area of the cell of the second eNB. The UE can then perform a cell reselection procedure. In the process, the UE can also acquire the H-SFN/SFN of the cell of the second eNB and the time based information broadcasted via SIB16 by the second eNB. The UE can then create a new or updated mapping between the H-SFN/SFN of the cell of the second eNB and the time based information of the second eNB. With the new or updated mapping, the UE can determine when the UE should become reachable within the eDRX cycle without requiring that the first eNB and the second eNB be synchronized.

Figure 5:
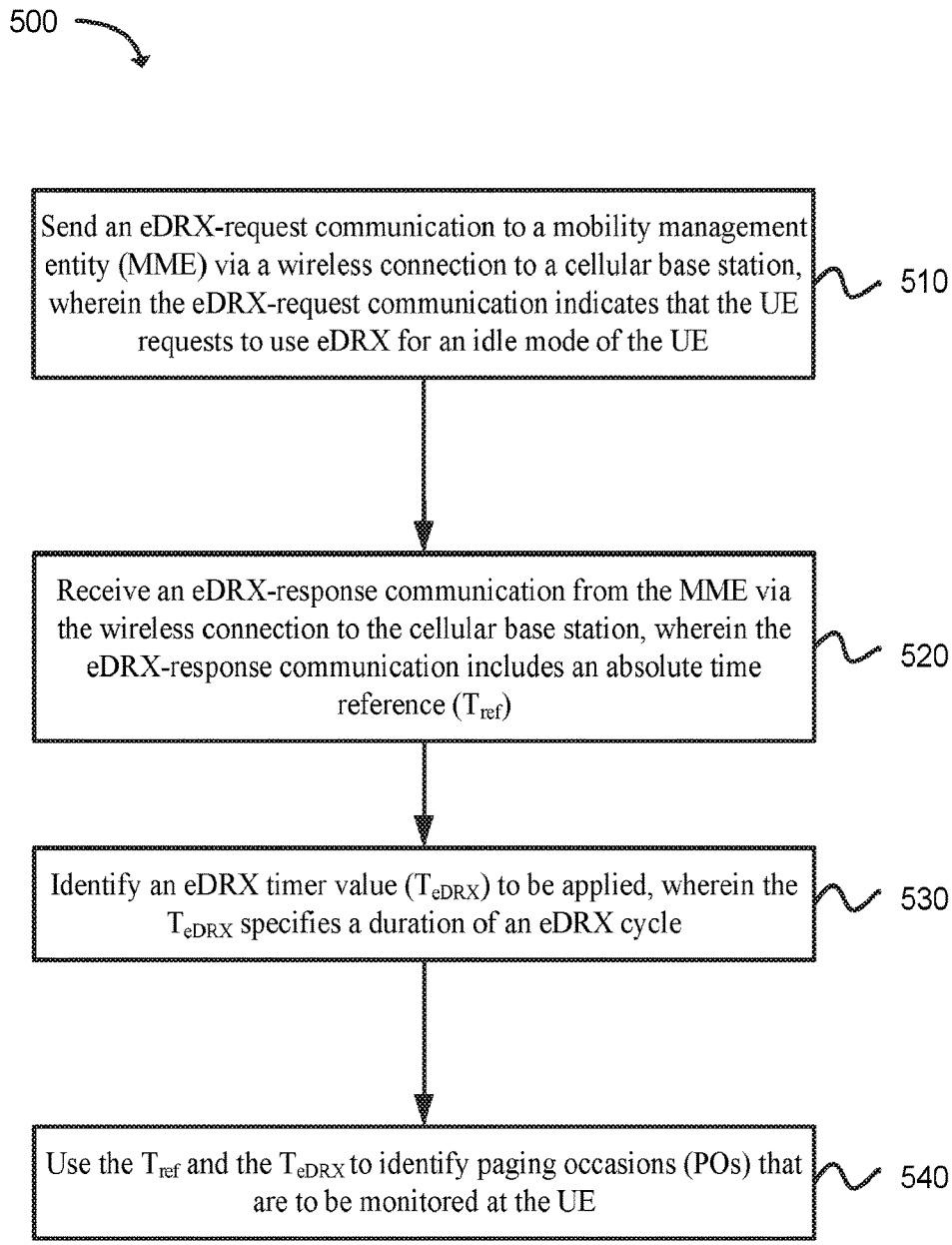
FIG. 5 illustrates functionality of a UE in accordance with an example.

FIG. 5 illustrates functionality 500 of a UE in accordance with an example. The functionality 500 can be implemented as a method or the functionality can be executed as instructions on a machine (e.g., by one or more processors), where the instructions are included on at least one non-transitory computer-readable storage medium.

As in block 510, circuitry at the UE (e.g., one or more processors) can be configured to send an eDRX-request communication to a mobility management entity (MME) via a wireless connection to a cellular base station, wherein the eDRX-request communication indicates that the UE requests to use eDRX for an idle mode of the UE.

As in block 520, the circuitry of the UE can also be configured to receive an eDRX-response communication from the MME via the wireless connection to the cellular base station, wherein the eDRX-response communication includes an absolute time reference ($T_{ref}$). The $T_{ref}$ can be based on Coordinated Universal Time (UTC) and can be encoded as a five-octet integer value.

As in block 530, the circuitry of the UE can also be configured to identify an eDRX timer value ($T_{eDRX}$) to be applied, wherein the $T_{eDRX}$ specifies a duration of an eDRX cycle. The $T_{eDRX}$ can be sent in the eDRX-request communication and can be received in $T_{eDRX}$ is received in the eDRX-response communication.

As in block 540, the circuitry of the UE can also be configured to use the $T_{ref}$ and the $T_{eDRX}$ to identify paging occasions (POs) that are to be monitored at the UE.

The circuitry of the UE can also be configured to switch the UE into a power-saving state that applies the extended DRX cycle; switch the UE from the power-saving state into the idle mode (which applies a normal DRX cycle) before a periodic time instant $T_N$, where $T_N$ is defined as $T_{ref}$+ $N*T_{eDRX}$, where N is a non-negative integer; monitor a paging occasion (PO) for a paging communication from the MME for at least a predefined period of time; and switch the UE back into the power-saving state.

The eDRX-response communication can include a number of normal discontinuous reception (DRX) repetitions ($N_{DRX}$) and the predefined period of time can be defined as $N_{DRX}*T_{DRX}$, wherein $T_{DRX}$ specifies a duration of a normal DRX cycle.

Alternatively, the circuitry of the UE can also be configured to switch the UE into a power-saving state that applies the extended DRX cycle; switch the UE from the power-saving state into the idle mode (which applies a normal DRX cycle) before a periodic time instant $T_N$, where $T_N$ is defined by the equation $T_N=T_{rlsUu}+T_{Offset}+N*T_{eDRX}$, wherein N is a positive integer, $T_{rlsUu}$ is a time instant when a Radio Resource Control (RRC) connection release procedure has been completed at the UE, and $T_{off}$ is a time offset value received at the UE in an RRC connection release message; monitor a paging occasion (PO) for a paging communication from the MME for at least a predefined period of time; and switch the UE back into the power-saving state.

The circuitry of the UE can also be configured to use a Tracking Area Update or an Attach Procedure to receive an eDRX configuration from the MME.

Figure 6:
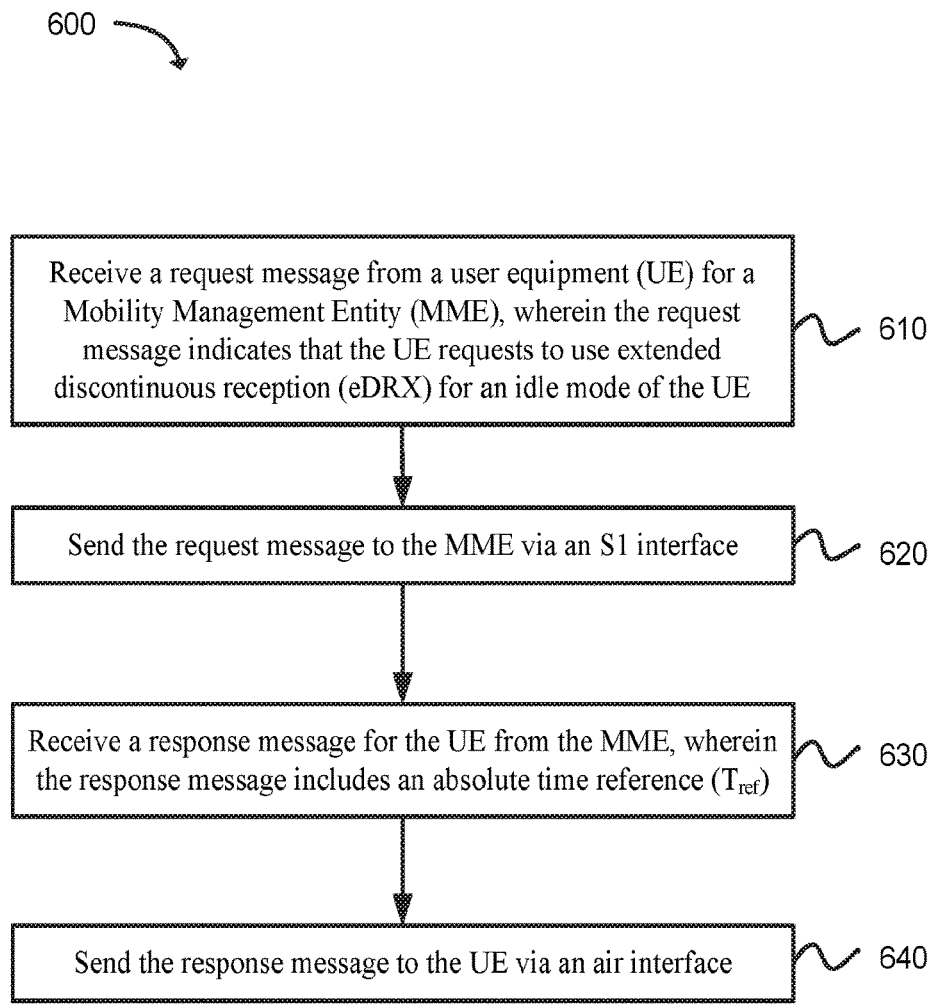
FIG. 6 illustrates functionality of an eNB in accordance with an example.

FIG. 6 illustrates functionality 600 of an eNB in accordance with an example. The functionality 600 can be implemented as a method or the functionality can be executed as instructions on a machine (e.g., by one or more processors), where the instructions are included on at least one non-transitory computer-readable storage medium.

As in block 610, circuitry at the eNB (e.g., one or more processors) can be configured to receive a request message from a user equipment (UE) for a Mobility Management Entity (MME), wherein the request message indicates that the UE requests to use extended discontinuous reception (eDRX) for an idle mode of the UE.

As in block 620, the circuitry at the eNB can also be configured to send the request message to the MME via an S1 interface.

As in block 630, the circuitry at the eNB can also be configured to receive a response message for the UE from the MME, wherein the response message includes an absolute time reference ($T_{ref}$).

As in block 640, the circuitry at the eNB can also be configured to send the response message to the UE via an air interface.

The circuitry at the UE can also be configured to receive an enhanced S1 Application Protocol (S1-AP) paging message for a user equipment (UE) when the UE is in an idle mode, wherein the enhanced S1-AP paging message includes a number of normal discontinuous reception (DRX) repetitions ($N_{DRX}$).

The circuitry at the UE can also be configured to send a paging communication to the UE on $N_{DRX}$ paging occasions (POs).

The circuitry at the UE can also be configured to receive an enhanced S1 Application Protocol (S1-AP) UE context release message for the UE when the UE is in a connected mode, wherein the enhanced S1-AP UE context release message includes a time offset value ($T_{Offset}$) to be applied by the UE.

The circuitry at the UE can also be configured to send a Radio Resource Control (RRC) Connection Release message to the UE, wherein the RRC Connection Release message includes the $T_{Offset}$.

The circuitry at the UE can also be configured to send multiple Radio Resource Control (RRC) paging messages based on an extended discontinuous reception (eDRX) configuration for the UE.

Figure 7:
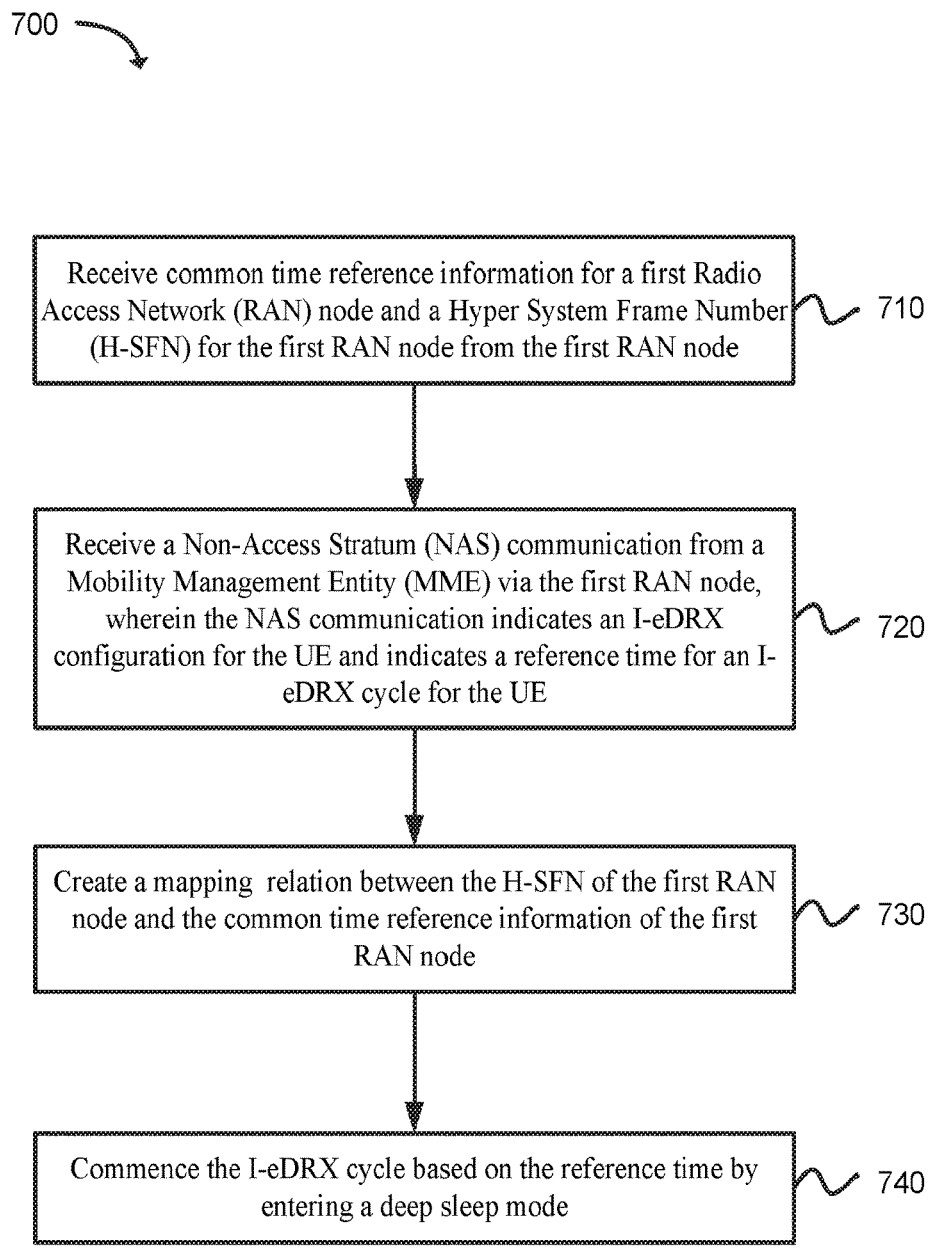
FIG. 7 illustrates functionality of a UE in accordance with an example.

FIG. 7 illustrates functionality 700 of a UE in accordance with an example. The functionality 700 can be implemented as a method or the functionality can be executed as instructions on a machine (e.g., by one or more processors), where the instructions are included on at least one non-transitory computer-readable storage medium.

As in block 710, circuitry at the UE (e.g., one or more processors) can be configured to receive common time reference information for a first Radio Access Network (RAN) node and a Hyper System Frame Number (H-SFN) for the first RAN node from the first RAN node.

As in block 720, the circuitry at the UE can also be configured to receive a Non-Access Stratum (NAS) communication from a Mobility Management Entity (MME) via the first RAN node, wherein the NAS communication indicates an I-eDRX configuration for the UE and indicates a reference time for an I-eDRX cycle for the UE.

As in block 730, the circuitry at the UE can also be configured to create a mapping relation between the H-SFN of the first RAN node and the common time reference information of the first RAN node.

As in block 740, the circuitry at the UE can also be configured to commence the I-eDRX cycle based on the reference time by entering a deep sleep mode. The reference time can be based on an absolute time reference or an event trigger.

The circuitry at the UE can also be configured to identify a time window in which the UE is to be prepared to receive a paging message based on the reference time and based on the mapping relation.

The circuitry at the UE can also be configured to awaken the UE temporarily from the deep sleep mode in order to correct internal clock drift; detect that the UE is in a cell of a second RAN node; receive common time reference information for the second RAN node and an H-SFN for the second RAN node from the second RAN node; create a replacement mapping relation between the H-SFN of the second RAN node and the common time reference information of the second RAN node; and identify a time window in which the UE is to be prepared to receive a paging message based on the reference time and based on the replacement mapping relation.

The circuitry at the UE can also be configured to receive the common time reference information for the first RAN node in a System Information Block 16 (SIB16), wherein the common time reference information includes an indication of a Coordinated Universal Time (UTC).

Figure 8:
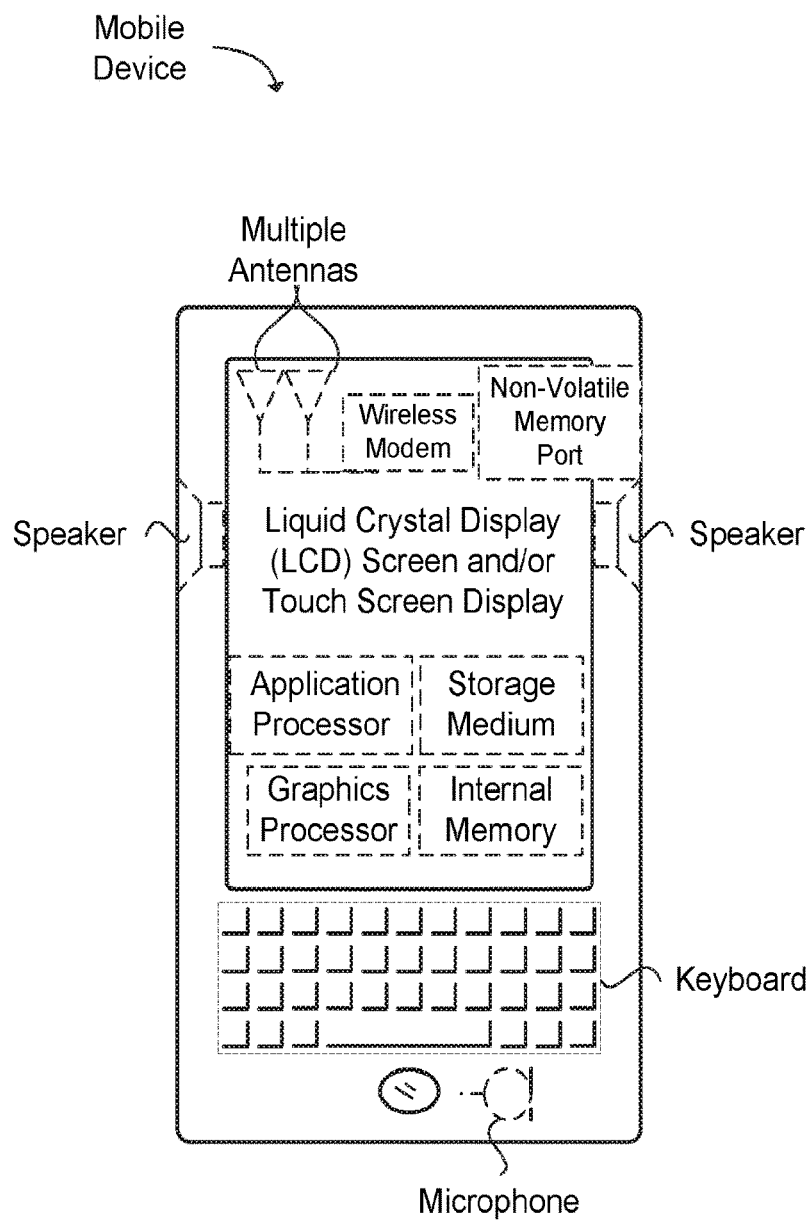
FIG. 8 provides an example illustration of a wireless device in accordance with an example.

FIG. 8 provides an example illustration of a mobile device, such as a user equipment (UE), a mobile station (MS), a mobile wireless device, a mobile communication device, a tablet, a handset, or other type of wireless device. The mobile device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard such as, but not limited to, 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

The mobile device can also comprise a wireless modem. The wireless modem can comprise, for example, a wireless radio transceiver and baseband circuitry (e.g., a baseband processor). The wireless modem can, in one example, modulate signals that the mobile device transmits via the one or more antennas and demodulate signals that the mobile device receives via the one or more antennas.

The mobile device can include a storage medium. In one aspect, the storage medium can be associated with and/or communication with the application processor, the graphics processor, the display, the non-volatile memory port, and/or internal memory. In one aspect, the application processor and graphics processor are storage mediums.

FIG. 8 also provides an illustration of a microphone and one or more speakers that can be used for audio input and output from the mobile device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the mobile device. A keyboard can be integrated with the mobile device or wirelessly connected to the wireless device to provide additional user input. A virtual keyboard can also be provided using the touch screen.

Figure 9:
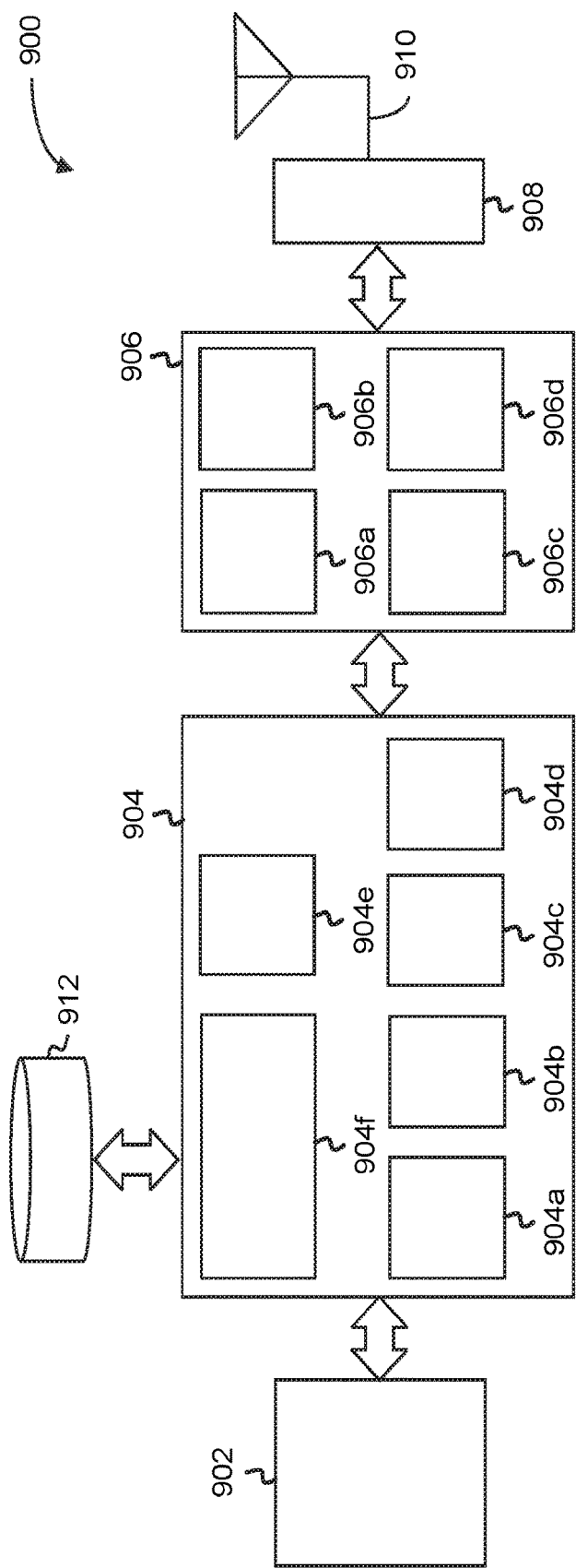
FIG. 9 provides an example illustration of a user equipment (UE) device, such as a wireless device, a mobile station (MS), a mobile wireless device, a mobile communication device, a tablet, a handset, or other type of wireless device.

FIG. 9 provides an example illustration of a user equipment (UE) device 900, such as a wireless device, a mobile station (MS), a mobile wireless device, a mobile communication device, a tablet, a handset, or other type of wireless device. The UE device 900 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 900 can be configured to communicate using at least one wireless communication standard such as, but not limited to, 3GPP LTE, WiMAX, High Speed Packet Access (HSPA), Bluetooth, and WiFi. The UE device 900 can communicate using separate antennas for each wireless communication standard or shared antennas for multiple wireless communication standards. The UE device 900 can communicate in a wireless local area network (WLAN), a wireless personal area network (WPAN), and/or a WWAN.

In some embodiments, the UE device 900 may include application circuitry 902, baseband circuitry 904, Radio Frequency (RF) circuitry 906, front-end module (FEM) circuitry 908 and one or more antennas 910, coupled together at least as shown.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage (e.g., storage medium 912) and may be configured to execute instructions stored in the memory/storage (e.g., storage medium 912) to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuity 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

The RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although other types of baseband signals may be used. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature down-conversion and/or up-conversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct down-conversion and/or direct up-conversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional NN+1 synthesizer.

In some embodiments, frequency input may be provided by a voltage controlled oscillator (VCO), although another type of device may also provide the frequency input. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE device 900 may include additional elements such as, for example, memory/storage, display (e.g., touch screen), camera, antennas, keyboard, microphone, speakers, sensor, and/or input/output (I/O) interface.

Figure 10:
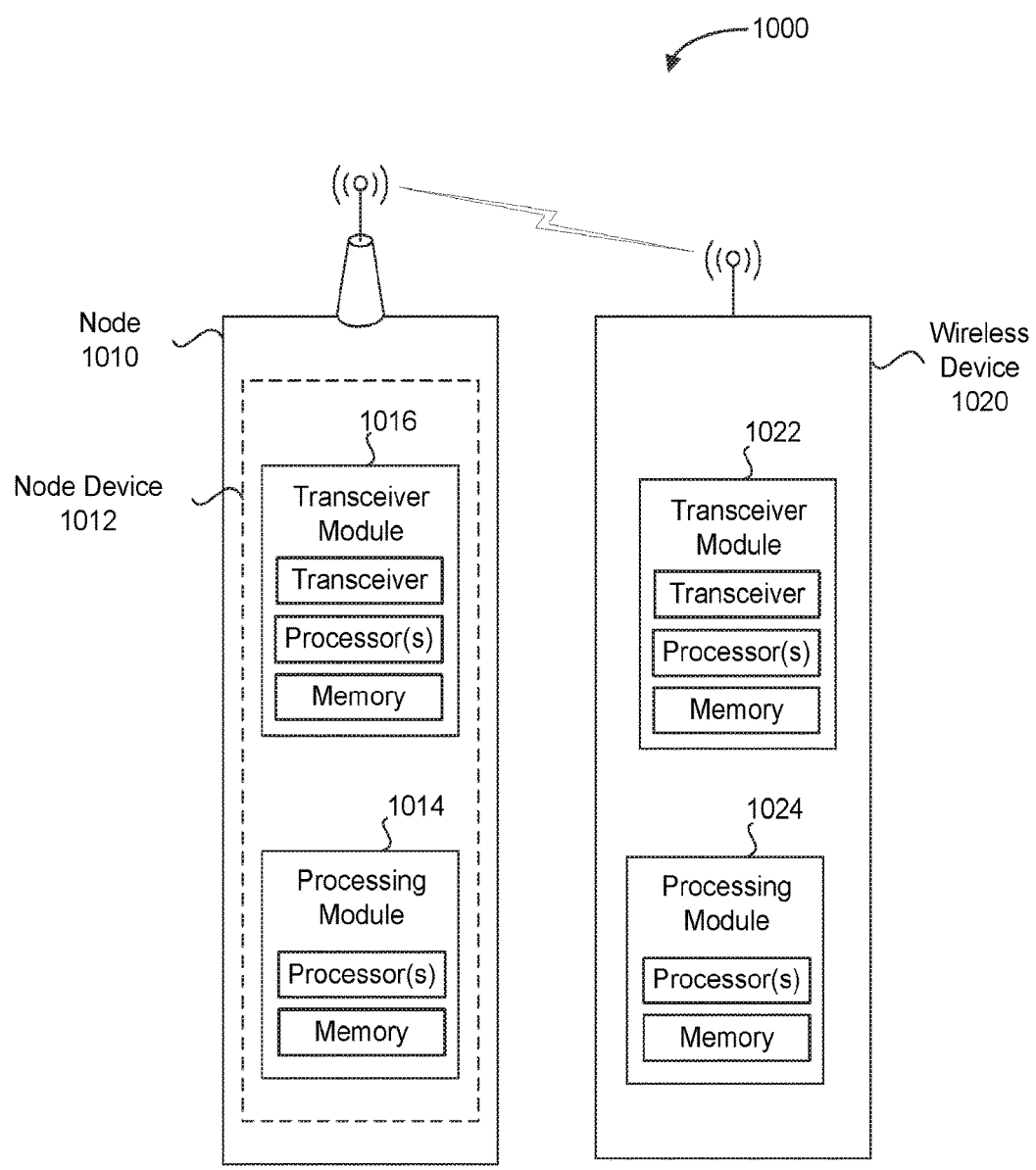
FIG. 10 illustrates a diagram of a node (e.g., eNB and/or a Serving GPRS Support Node) and a wireless device (e.g., UE) in accordance with an example.

FIG. 10 illustrates a diagram 1000 of a node 1010 (e.g., eNB and/or a Serving GPRS Support Node) and a wireless device 1020 (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1010 can include a node device 1012. The node device 1012 or the node 1010 can be configured to communicate with the wireless device 1020. The node device 1012 can be configured to implement technologies described herein. The node device 1012 can include a processing module 1014 and a transceiver module 1016. In one aspect, the node device 1012 can include the transceiver module 1016 and the processing module 1014 forming a circuitry for the node 1010. In one aspect, the transceiver module 1016 and the processing module 1014 can form a circuitry of the node device 1012. The processing module 1014 can include one or more processors and memory. In one embodiment, the processing module 1022 can include one or more application processors. The transceiver module 1016 can include a transceiver and one or more processors and memory. In one embodiment, the transceiver module 1016 can include a baseband processor.

The wireless device 1020 can include a transceiver module 1024 and a processing module 1022. The processing module 1022 can include one or more processors and memory. In one embodiment, the processing module 1022 can include one or more application processors. The transceiver module 1024 can include a transceiver and one or more processors and memory. In one embodiment, the transceiver module 1024 can include a baseband processor. The wireless device 1020 can be configured to implement technologies described herein. The node 1010 and the wireless devices 1020 can also include one or more storage mediums, such as the transceiver module 1016, 1024 and/or the processing module 1014, 1022.

EXAMPLES

The following examples pertain to specific embodiments and point out specific features, elements, or steps that can be used or otherwise combined in achieving such embodiments.

Example 1 includes a user equipment (UE) (or an apparatus thereof) capable of applying extended discontinuous reception (eDRX) to reduce energy consumption at the UE, the UE comprising one or more processors and memory configured to: signal transceiver circuitry at the UE to send an eDRX-request communication to a mobility management entity (MME) via a wireless connection to a cellular base station, wherein the eDRX-request communication indicates that the UE requests to use eDRX for an idle mode of the UE; identify an eDRX-response communication from the MME received via the wireless connection to the cellular base station, wherein the eDRX-response communication includes an absolute time reference ($T_{ref}$); identify an eDRX timer value ($T_{eDRX}$) to be applied, wherein the $T_{eDRX}$ specifies a duration of an eDRX cycle; and use the $T_{ref}$ and the $T_{eDRX}$ to identify paging occasions (POs) that are to be monitored at the UE.

Example 2 includes the UE of example 1, wherein the $T_{eDRX}$ is sent in the eDRX-request communication.

Example 3 includes the UE of example 1 or 2, wherein the $T_{eDRX}$ is received in the eDRX-response communication.

Example 4 includes the UE of example 1, 2, or 3, wherein the $T_{ref}$ is based on Coordinated Universal Time (UTC) and the $T_{ref}$ is encoded as a five-octet integer value.

Example 5 includes the UE of example 1, 2, 3, or 4, wherein the one or more processors and memory are further configured to: switch the UE into a power-saving state that applies the extended DRX cycle; switch the UE from the power-saving state into the idle mode (which applies a normal DRX cycle) before a periodic time instant $T_N$, where $T_N$ is defined as $T_{ref}+N*T_{eDRX}$, where N is a non-negative integer; monitor a paging occasion (PO) for a paging communication from the MME for at least a predefined period of time; and switch the UE back into the power-saving state.

Example 6 includes the UE of example 5, wherein the eDRX-response communication includes a number of normal discontinuous reception (DRX) repetitions ($N_{DRX}$) and the predefined period of time is defined as $N_{DRX}*T_{DRX}$, wherein $T_{DRX}$ specifies a duration of a normal DRX cycle.

Example 7 includes the UE of example 1, 2, 3, or 4, wherein the one or more processors and memory are further configured to: switch the UE into a power-saving state that applies the extended DRX cycle; switch the UE from the power-saving state into the idle mode (which applies a normal DRX cycle) before a periodic time instant $T_N$, where $T_N$ is defined by the equation $T_N=T_{rlsUu}+T_{Offset}+N*T_{eDRX}$, wherein N is a positive integer, $T_{rlsUu}$ is a time instant when a Radio Resource Control (RRC) connection release procedure has been completed at the UE, and $T_{Offset}$ is a time offset value received at the UE in an RRC connection release message; monitor a paging occasion (PO) for a paging communication from the MME for at least a predefined period of time; and switch the UE back into the power-saving state.

Example 8 includes the UE of example 1, 2, 3, 4, 5, 6, or 7, wherein the one or more processors and memory further configured to use a Tracking Area Update or an Attach Procedure to receive an eDRX configuration from the MME.

Example 9 includes a Mobility Management Entity (MME) comprising one or more processors and memory configured to: identify a request message from a user equipment (UE) received via an evolved Node B (eNB), wherein the request message indicates that the UE wishes to use extended discontinuous reception (eDRX) for an idle mode of the UE; and signal the eNB to send a response message to the UE, wherein the response message includes an absolute time reference ($T_{ref}$).

Example 10 includes the MME of example 9, wherein the request message includes an eDRX timer value ($T_{eDRX}$) to be applied at the UE and the response message includes either a verification that the $T_{eDRX}$ is acceptable or an indication of an alternative $T_{eDRX}$.

Example 11 includes the MME of example 9 or 10, wherein the response message includes an eDRX timer value ($T_{eDRX}$) to be applied at the UE.

Example 12 includes the MME of example 11, wherein the one or more processors and memory are further configured to send an enhanced S1 Application Protocol (S1-AP) paging message to the eNB before a periodic time instant $T_N$, wherein $T_N$ is defined by the equation $T_N=T_{ref}+N*T_{eDRX}$, where N is a positive integer.

Example 13 includes the MME of example 12, wherein the enhanced S1-AP paging message includes a number of normal discontinuous reception (DRX) repetitions ($N_{DRX}$) to be applied by the UE.

Example 14 includes The MME of example 9, 10, or 11, wherein the one or more processors and memory are further configured to: send an enhanced S1 Application Protocol (S1-AP) UE context release message to the eNB, wherein the S1-AP UE context release message includes a time offset value ($T_{Offset}$); and send an S1 Application Protocol (S1-AP) paging message to the eNB before a periodic time instant $T_N$, where $T_N$ is defined by the equation $T_N=T_{rlsS1}+T_{Offset}+N*T_{eDRX}$, wherein N is a positive integer and $T_{rlsS1}$ is a time instant when an S1 release procedure for the UE has been completed at the MME.

Example 15 includes the MME of example 9, 10, 11, 12, 13, or 14, wherein the one or more processors and memory are further configured to provide an eDRX configuration to the UE via a tracking area update or via an attach procedure.

Example 16 includes the UE of example 9, 10, 11, 12, 13, 14, or 15, wherein the one or more processors and memory are is further configured to select the $T_{ref}$ that is sent in the response message in a UE-specific manner in order to stagger paging cycles of a plurality of UEs in order to prevent access-related congestion.

Example 17 includes an evolved node B (eNB) comprising one or more processors and memory configured to: identify a request message received from a user equipment (UE) for a Mobility Management Entity (MME), wherein the request message indicates that the UE requests to use extended discontinuous reception (eDRX) for an idle mode of the UE; send the request message to the MME via an S1 interface; identify a response message for the UE received from the MME, wherein the response message includes an absolute time reference ($T_{ref}$); and signal transceiver circuitry at the eNB to send the response message to the UE via an air interface.

Example 18 includes the eNB of example 17, wherein the one or more processors and memory are further configured to receive an enhanced S1 Application Protocol (S1-AP) paging message for a user equipment (UE) when the UE is in an idle mode, wherein the enhanced S1-AP paging message includes a number of normal discontinuous reception (DRX) repetitions ($N_{DRX}$).

Example 19 includes the eNB of example 18, wherein the one or more processors and memory are further configured to signal the transceiver circuitry at the eNB to send a paging communication to the UE on $N_{DRX}$ paging occasions (POs).

Example 20 includes the eNB of example 17, 18, or 19, wherein the one or more processors and memory are further configured to receive an enhanced S1 Application Protocol (S1-AP) UE context release message for the UE when the UE is in a connected mode, wherein the enhanced S1-AP UE context release message includes a time offset value ($T_{Offset}$) to be applied by the UE.

Example 21 includes the eNB of example 20, wherein the one or more processors and memory are further configured to signal the transceiver circuitry at the eNB to send a Radio Resource Control (RRC) Connection Release message to the UE, wherein the RRC Connection Release message includes the $T_{Offset}$.

Example 22 includes the eNB of example 17, 18, 19, 20, or 21, wherein the one or more processors and memory are further configured to signal the transceiver circuitry at the eNB to send multiple Radio Resource Control (RRC) paging messages based on an extended discontinuous reception (eDRX) configuration for the UE.

Example 23 includes an apparatus of a user equipment (UE) that supports idle-mode extended discontinuous reception (I-eDRX), the apparatus comprising one or more processors and memory configured to: identify common time reference information for a first Radio Access Network (RAN) node and a Hyper System Frame Number (H-SFN) for the first RAN node received from the first RAN node; identify a Non-Access Stratum (NAS) communication from a Mobility Management Entity (MME) received via the first RAN node, wherein the NAS communication indicates an I-eDRX configuration for the UE and indicates a reference time for an I-eDRX cycle for the UE; create a mapping relation between the H-SFN of the first RAN node and the common time reference information of the first RAN node; and commence the I-eDRX cycle based on the reference time by entering a deep sleep mode.

Example 24 includes the apparatus of example 23, wherein the one or more processors and memory are further configured to: identify a time window in which the UE is to be prepared to receive a paging message based on the reference time and based on the mapping relation.

Example 25 includes the apparatus of example 23 or 24, wherein the one or more processors and memory are further configured to: awaken the UE temporarily from the deep sleep mode in order to correct internal clock drift; detect that the UE is in a cell of a second RAN node; receive common time reference information for the second RAN node and an H-SFN for the second RAN node from the second RAN node; create a replacement mapping relation between the H-SFN of the second RAN node and the common time reference information of the second RAN node; and identify a time window in which the UE is to be prepared to receive a paging message based on the reference time and based on the replacement mapping relation.

Example 26 includes the apparatus of example 23, 24, or 25, wherein the one or more processors and memory are further configured to: identify the common time reference information for the first RAN node received in a System Information Block 16 (SIB16), wherein the common time reference information includes an indication of a Coordinated Universal Time (UTC).

Example 27 includes the apparatus of example 23, 24, 25, or 26, wherein the reference time is based on an absolute time reference or an event trigger.

Example 28 includes an apparatus of a user equipment (UE) that supports idle-mode extended discontinuous reception (I-eDRX), the apparatus comprising one or more processors and memory configured to: receive common time reference information for a first Radio Access Network (RAN) node and a Hyper System Frame Number (H-SFN) for the first RAN node from the first RAN node; identify a Non-Access Stratum (NAS) communication from a Mobility Management Entity (MME) received via the first RAN node, wherein the NAS communication indicates an I-eDRX configuration for the UE and indicates a reference time for an I-eDRX cycle for the UE, wherein the reference time is based on an absolute time reference or an event trigger; create a mapping relation between the H-SFN of the first RAN node and the common time reference information of the first RAN node; identify a time window in which the UE is to be prepared to receive a paging message based on the reference time and based on the mapping relation; and commence the I-eDRX cycle based on the reference time by entering a deep sleep mode.

Example 29 includes the apparatus of example 28, wherein the one or more processors and memory are further configured to: awaken the UE temporarily from the deep sleep mode in order to correct internal clock drift; detect that the UE is in a cell of a second RAN node; receive common time reference information for the second RAN node and an H-SFN for the second RAN node from the second RAN node; create a replacement mapping relation between the H-SFN of the second RAN node and the common time reference information of the second RAN node; and identify a time window in which the UE is to be prepared to receive a paging message based on the reference time and based on the replacement mapping relation.

Example 30 includes the apparatus of example 28, wherein the one or more processors and memory are further configured to: identify the common time reference information for the first RAN node received in a System Information Block 16 (SIB16), wherein the common time reference information includes an indication of a Coordinated Universal Time (UTC).

Example 31 includes a user equipment (UE) capable of applying extended discontinuous reception (eDRX) to reduce energy consumption at the UE, the UE comprising one or more processors and memory configured to: signal transceiver circuitry at the UE to send an eDRX-request communication to a mobility management entity (MME) via a wireless connection to a cellular base station, wherein the eDRX-request communication indicates that the UE requests to use eDRX for an idle mode of the UE; identify an eDRX-response communication from the MME received via the wireless connection to the cellular base station, wherein the eDRX-response communication includes an absolute time reference ($T_{ref}$) that is based on Coordinated Universal Time (UTC); identify an eDRX timer value ($T_{eDRX}$) to be applied, wherein the $T_{eDRX}$ specifies a duration of an eDRX cycle; and use the $T_{ref}$ and the $T_{eDRX}$ to identify paging occasions (POs) that are to be monitored at the UE.

Example 32 includes the UE of example 31, wherein the $T_{eDRX}$ is sent in the eDRX-request communication or received in the eDRX-response communication.

Example 33 includes the UE of example 31 or 32, wherein the eDRX-response communication includes a number of normal discontinuous reception (DRX) repetitions ($N_{DRX}$) and the predefined period of time is defined as $N_{DRX}*T_{DRX}$, wherein $T_{DRX}$ specifies a duration of a normal DRX cycle, and wherein the one or more processors and memory are further configured to: switch the UE into a power-saving state that applies the extended DRX cycle; switch the UE from the power-saving state into the idle mode (which applies a normal DRX cycle) before a periodic time instant $T_N$, where $T_N$ is defined as $T_{ref}+N*T_{eDRX}$, where N is a non-negative integer; monitor a paging occasion (PO) for a paging communication from the MME for at least a predefined period of time; and switch the UE back into the power-saving state.

Example 34 includes the UE of example 31 or 32, wherein the one or more processors and memory are further configured to: switch the UE into a power-saving state that applies the extended DRX cycle; switch the UE from the power-saving state into the idle mode (which applies a normal DRX cycle) before a periodic time instant $T_N$, where $T_N$ is defined by the equation $T_N=T_{rlsUu}+T_{Offset}+N*T_{eDRX}$, wherein N is a positive integer, $T_{rlsUu}$ is a time instant when a Radio Resource Control (RRC) connection release procedure has been completed at the UE, and $T_{Offset}$ is a time offset value received at the UE in an RRC connection release message; monitor a paging occasion (PO) for a paging communication from the MME for at least a predefined period of time; and switch the UE back into the power-saving state.

Example 35 includes the UE of example 31, 32, 33, or 34, wherein the one or more processors and memory further configured to use a Tracking Area Update or an Attach Procedure to receive an eDRX configuration from the MME.

Example 36 includes a Mobility Management Entity (MME) comprising one or more processors and memory configured to: identify a request message from a user equipment (UE) received via an evolved Node B (eNB), wherein the request message indicates that the UE wishes to use extended discontinuous reception (eDRX) for an idle mode of the UE and the request message includes an eDRX timer value ($T_{eDRX}$) to be applied at the UE; and signal the eNB to send a response message to the UE, wherein the response message includes an absolute time reference ($T_{ref}$) and either a verification that the $T_{eDRX}$ is acceptable or an indication of an alternative $T_{eDRX}$.

Example 37 includes the MME of example 36, wherein the response message includes an eDRX timer value ($T_{eDRX}$) to be applied at the UE and wherein the one or more processors and memory are further configured to: send an enhanced S1 Application Protocol (S1-AP) paging message to the eNB before a periodic time instant $T_N$, wherein $T_N$ is defined by the equation $T_N=T_{ref}N*T_{eDRX}$ or by the equation $T_N=T_{rlsS1}+T_{Offset}+N*T_{eDRX}$, where N is a positive integer and $T_{rlsS1}$ is a time instant when an S1 release procedure for the UE has been completed at the MME, and wherein the enhanced S1-AP paging message includes a number of normal discontinuous reception (DRX) repetitions ($N_{DRX}$) to be applied by the UE; send an enhanced S1 Application Protocol (S1-AP) UE context release message to the eNB, wherein the S1-AP UE context release message includes a time offset value ($T_{Offset}$); and send an S1 Application Protocol (S1-AP) paging message to the eNB before a periodic time instant $T_N$, where $T_N$ is defined by the equation, wherein N is a positive integer and.

Example 38 includes the MME of example 36 or 37, wherein the one or more processors and memory are further configured to: provide an eDRX configuration to the UE via a tracking area update or via an attach procedure; or select the $T_{ref}$ that is sent in the response message in a UE-specific manner in order to stagger paging cycles of a plurality of UEs in order to prevent access-related congestion.

Example 39 includes an evolved node B (eNB) comprising one or more processors and memory configured to: identify a request message received from a user equipment (UE) for a Mobility Management Entity (MME), wherein the request message indicates that the UE requests to use extended discontinuous reception (eDRX) for an idle mode of the UE; send the request message to the MME via an S1 interface; receive a response message for the UE from the MME, wherein the response message includes an absolute time reference ($T_{ref}$); and signal transceiver circuitry at the eNB to send the response message to the UE via an air interface.

Example 40 includes the eNB of example 39, wherein the one or more processors and memory are further configured to: receive an enhanced S1 Application Protocol (S1-AP) paging message for the UE when the UE is in an idle mode, wherein the enhanced S1-AP paging message includes a number of normal discontinuous reception (DRX) repetitions ($N_{DRX}$); and signal the transceiver circuitry at the eNB to send a paging communication to the UE on $N_{DRX}$ paging occasions (POs).

Example 41 includes the eNB of example 39 or 40, wherein the one or more processors and memory are further configured to: receive an enhanced S1 Application Protocol (S1-AP) UE context release message for the UE when the UE is in a connected mode, wherein the enhanced S1-AP UE context release message includes a time offset value ($T_{Offset}$) to be applied by the UE; and send a Radio Resource Control (RRC) Connection Release message to the UE, wherein the RRC Connection Release message includes the $T_{Offset}$.

Example 42 includes the eNB of example 39, 40, or 41, wherein the one or more processors and memory are further configured to send multiple Radio Resource Control (RRC) paging messages based on an extended discontinuous reception (eDRX) configuration for the UE.

Example 43 includes an apparatus of a user equipment (UE) that supports idle-mode extended discontinuous reception (I-eDRX), the apparatus comprising one or more processors and memory configured to: identify common time reference information for a first Radio Access Network (RAN) node and a Hyper System Frame Number (H-SFN) for the first RAN node received from the first RAN node; identify a Non-Access Stratum (NAS) communication from a Mobility Management Entity (MME) received via the first RAN node, wherein the NAS communication indicates an I-eDRX configuration for the UE and indicates a reference time for an I-eDRX cycle for the UE, wherein the reference time is based on an absolute time reference or an event trigger; create a mapping relation between the H-SFN of the first RAN node and the common time reference information of the first RAN node; identify a time window in which the UE is to be prepared to receive a paging message based on the reference time and based on the mapping relation; and commence the I-eDRX cycle based on the reference time by entering a deep sleep mode.

Example 44 includes the apparatus of example 43, wherein the one or more processors and memory are further configured to: awaken the UE temporarily from the deep sleep mode in order to correct internal clock drift; detect that the UE is in a cell of a second RAN node; receive common time reference information for the second RAN node and an H-SFN for the second RAN node from the second RAN node; create a replacement mapping relation between the H-SFN of the second RAN node and the common time reference information of the second RAN node; and identify a time window in which the UE is to be prepared to receive a paging message based on the reference time and based on the replacement mapping relation.

Example 45 includes the apparatus of example 43 or 44, wherein the one or more processors and memory are further configured to: identify the common time reference information for the first RAN node received in a System Information Block 16 (SIB16), wherein the common time reference information includes an indication of a Coordinated Universal Time (UTC).

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages may be added to the logical flow for enhanced utility, accounting, performance, measurement, troubleshooting, or other purposes.

As used herein, the word "or" indicates an inclusive disjunction. For example, as used herein, the phrase "A or B" represents an inclusive disjunction of exemplary conditions A and B. Hence, "A or B" is false only if both condition A is false and condition B is false. When condition A is true and condition B is also true, "A or B" is also true. When condition A is true and condition B is false, "A or B" is true. When condition B is true and condition A is false, "A or B" is true. In other words, the term "or," as used herein, should not be construed as an exclusive disjunction. The term "xor" is used where an exclusive disjunction is intended.

As used herein, the term processor can include general-purpose processors, specialized processors such as VLSI, FPGAs, and other types of specialized processors, as well as base-band processors used in transceivers to send, receive, and process wireless communications.

It should be understood that many of the functional units described in this specification have been labeled as modules, in order to more particularly emphasize their implementation independence. For example, a module can be implemented as a hardware circuit (e.g., an application-specific integrated circuit (ASIC)) comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module do not have to be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous.

Furthermore, the described features, structures, or characteristics can be combined in any suitable manner in one or more embodiments. In the foregoing description, numerous specific details are provided, such as examples of layouts, distances, network examples, etc., to provide a thorough understanding of some embodiments. One skilled in the relevant art will recognize, however, that the some embodiments can be practiced without one or more of the specific details, or with other methods, components, layouts, etc. In other instances, well-known structures, materials, or operations are not shown or described in detail to avoid obscuring aspects of different embodiments.

While the forgoing examples are illustrative of the principles used in various embodiments in one or more particular applications, it will be apparent to those of ordinary skill in the art that numerous modifications in form, usage and details of implementation can be made without the exercise of inventive faculty, and without departing from the principles and concepts of the embodiments. Accordingly, it is not intended that the claimed matter be limited, except as by the claims set forth below.

What is claimed is:

1. A user equipment (UE) capable of applying extended discontinuous reception (eDRX) to reduce energy consumption at the UE, the UE comprising,
one or more processors configured to:
signal transceiver circuitry at the UE to send an eDRX-request communication to a mobility management entity (MIME) via a wireless connection to a cellular base station, wherein the eDRX-request communication indicates that the UE requests to use eDRX for an idle mode of the UE;
identify an eDRX-response communication received from the MME via the wireless connection to the cellular base station, wherein the eDRX-response communication includes an absolute time reference ($T_{ref}$);
identify an eDRX timer value ($T_{eDRX}$) to be applied, wherein the $T_{eDRX}$ specifies a duration of an eDRX cycle;
switch the UE into a power-saving state that applies the eDRX cycle;
switch the UE from the power-saving state into the idle mode, which applies a normal DRX cycle, before a periodic time instant $T_N$;
monitor a paging occasion (PO) for a paging communication from the MME for at least a predefined period of time;
switch the UE back into the power-saving state; and
use the $T_{ref}$ and the $T_{eDRX}$ to identify paging occasions (POs) that are to be monitored at the UE; and
a memory configured to communicate with the one or more processors.

2. The UE of claim 1, wherein the $T_{eDRX}$ is sent in the eDRX-request communication.

3. The UE of claim 1, wherein the $T_{eDRX}$ is received in the eDRX-response communication.

4. The UE of claim 1, wherein the $T_{ref}$ is based on Coordinated Universal Time (UTC) and the $T_{ref}$ is encoded as a five-octet integer value.

5. The UE of claim 1, wherein the one or more processors are further configured to:
switch the UE from the power-saving state into the idle mode before the periodic time instant $T_N$, where $T_N$ is defined as $T_{ref}+N*T_{eDRX}$, where N is a non-negative integer;
monitor (PO) for a paging communication from the MME for at least the predefined period of time; and
switch the UE back into the power-saving state.

6. The UE of claim 5, wherein the eDRX-response communication includes a number of normal discontinuous reception (DRX) repetitions ($N_{DRX}$) and the predefined period of time is defined as $N_{DRX}*T_{DRX}$, wherein $T_{DRX}$ specifies a duration of a normal DRX cycle.

7. The UE of claim 1, wherein the one or more processors are further configured to:
switch the UE from the power-saving state into the idle mode before the periodic time instant $T_N$, where $T_N$ is defined by the equation $T_N=T_{rlsUu}+T_{Offset}+N*T_{eDRX}$, wherein N is a positive integer, $T_{rlsUu}$ is a time instant when a Radio Resource Control (RRC) connection release procedure has been completed at the UE, and $T_{Offset}$ is a time offset value received at the UE in an RRC connection release message;
monitor the paging occasion (PO) for the paging communication from the MME for at least the predefined period of time; and
switch the UE back into the power-saving state.

8. The UE of claim 1, wherein the one or more processors are further configured to use a Tracking Area Update or an Attach Procedure to receive an eDRX configuration from the MME.

9. A Mobility Management Entity (MME) comprising:
one or more processors configured to:
identify a request message received from a user equipment (UE) via an evolved Node B (eNB), wherein the request message indicates that the UE wishes to use extended discontinuous reception (eDRX) for an idle mode of the UE;
send an enhanced S1 Application Protocol (S1-AP) paging message to the eNB before a periodic time instant $T_N$; and
signal the eNB to send a response message to the UE, wherein the response message includes an absolute time reference ($T_{ref}$); and
a memory configured to communicate with the one or more processors.

10. The MME of claim 9, wherein the request message includes an eDRX timer value ($T_{eDRX}$) to be applied by the one or more processors at the UE and the response message includes either a verification that the $T_{eDRX}$ is acceptable or an indication of an alternative $T_{eDRX}$.

11. The MME of claim 9, wherein the response message includes an eDRX timer value ($T_{eDRX}$) to be applied by the one or more processors at the UE.

12. The MME of claim 11, wherein the one or more processors are further configured to send the enhanced S1 Application Protocol (S1-AP) paging message to the eNB before the periodic time instant $T_N$, wherein $T_N$ is defined by the equation $T_N=T_{ref}+N*T_{eDRX}$, where N is a positive integer.

13. The MME of claim 12, wherein the enhanced S1-AP paging message includes a number of normal discontinuous reception (DRX) repetitions ($N_{DRX}$) to be applied by the one or more processors at the UE.

14. The MME of claim 11, wherein the one or more processors are further configured to:
    send an enhanced S1 Application Protocol (S1-AP) UE context release message to the eNB, wherein the S1-AP UE context release message includes a time offset value ($T_{Offset}$); and
    send an S1 Application Protocol (S1-AP) paging message to the eNB before a periodic time instant $T_N$, where $T_N$ is defined by the equation $T_N=T_{rlsS1}+T_{Offset}+N*T_{eDRX}$, wherein N is a positive integer and $T_{rlsS1}$ is a time instant when an S1 release procedure for the UE has been completed at the MME.

15. The MME of claim 9, wherein the one or more processors are further configured to provide an eDRX configuration to the UE via a tracking area update or via an attach procedure.

16. The UE of claim 9, wherein the one or more processors are further configured to select the $T_{ref}$ that is sent in the response message in a UE-specific manner in order to stagger paging cycles of a plurality of UEs in order to prevent access-related congestion.

17. An evolved node B (eNB) comprising:
    one or more processors configured to:
        identify a request message received from a user equipment (UE) for a Mobility Management Entity (MME), wherein the request message indicates that the UE requests to use extended discontinuous reception (eDRX) for an idle mode of the UE;
        send the request message to the MME via an S1 interface;
        receive a response message for the UE from the MME, wherein the response message includes an absolute time reference ($T_{ref}$);
        receive an enhanced S1 Application Protocol (S1-AP) paging message for a user equipment (UE) when the UE is in an idle mode, wherein the enhanced S1-SP paging message includes a number of normal discontinuous reception (DRX) repetitions ($N_{DRX}$); and
        signal transceiver circuitry at the eNB to send the response message to the UE via an air interface; and
    a memory configured to communicate with the one or more processors.

18. The eNB of claim 17, wherein the one or more processors are further configured to signal the transceiver circuitry at the eNB to send a paging communication to the UE on $N_{DRX}$ paging occasions (POs).

19. The eNB of claim 17, wherein the one or more processors are further configured to receive an enhanced S1 Application Protocol (S1-AP) UE context release message for the UE when the UE is in a connected mode, wherein the enhanced S1-AP UE context release message includes a time offset value ($T_{Offset}$) to be applied by the UE.

20. The eNB of claim 19, wherein the one or more processors are further configured to signal the transceiver circuitry at the eNB to send a Radio Resource Control (RRC) Connection Release message to the UE, wherein the RRC Connection Release message includes the $T_{Offset}$.

21. The eNB of claim 17, wherein the one or more processors are further configured to signal the transceiver circuitry at the eNB to send multiple Radio Resource Control (RRC) paging messages based on an extended discontinuous reception (eDRX) configuration for the UE.

22. An apparatus of a user equipment (UE) that supports idle-mode extended discontinuous reception (I-eDRX), the apparatus comprising:
    one or more processors configured to:
        identify common time reference information for a first Radio Access Network (RAN) node and a Hyper System Frame Number (H-SFN) for the first RAN node received from the first RAN node;
        identify a Non-Access Stratum (NAS) communication from a Mobility Management Entity (MME) received via the first RAN node, wherein the NAS communication indicates an I-eDRX configuration for the UE and indicates a reference time for an I-eDRX cycle for the UE;
        create a mapping relation between the H-SFN of the first RAN node and the common time reference information of the first RAN node; and
        commence the I-eDRX cycle based on the reference time by entering a deep sleep mode and
    a memory configured to communicate with the one or more processors.

23. The apparatus of claim 22, wherein the one or more processors are further configured to:
    identify a time window in which the UE is to be prepared to receive a paging message based on the reference time and based on the mapping relation.

24. The apparatus of claim 22, wherein the one or more processors are further configured to:
    awaken the UE temporarily from the deep sleep mode in order to correct internal clock drift;
    detect that the UE is in a cell of a second RAN node;
    identify common time reference information for the second RAN node and an H-SFN for the second RAN node received from the second RAN node;
    create a replacement mapping relation between the H-SFN of the second RAN node and the common time reference information of the second RAN node; and
    identify a time window in which the UE is to be prepared to receive a paging message based on the reference time and based on the replacement mapping relation.

25. The apparatus of claim 22, wherein the one or more processors are further configured to:
    identify the common time reference information for the first RAN node received in a System Information Block 16 (SIB16), wherein the common time reference information includes an indication of a Coordinated Universal Time (UTC).

26. The apparatus of claim 22, wherein the reference time is based on an absolute time reference or an event trigger.

* * * * *